UNITED STATES PATENT OFFICE.

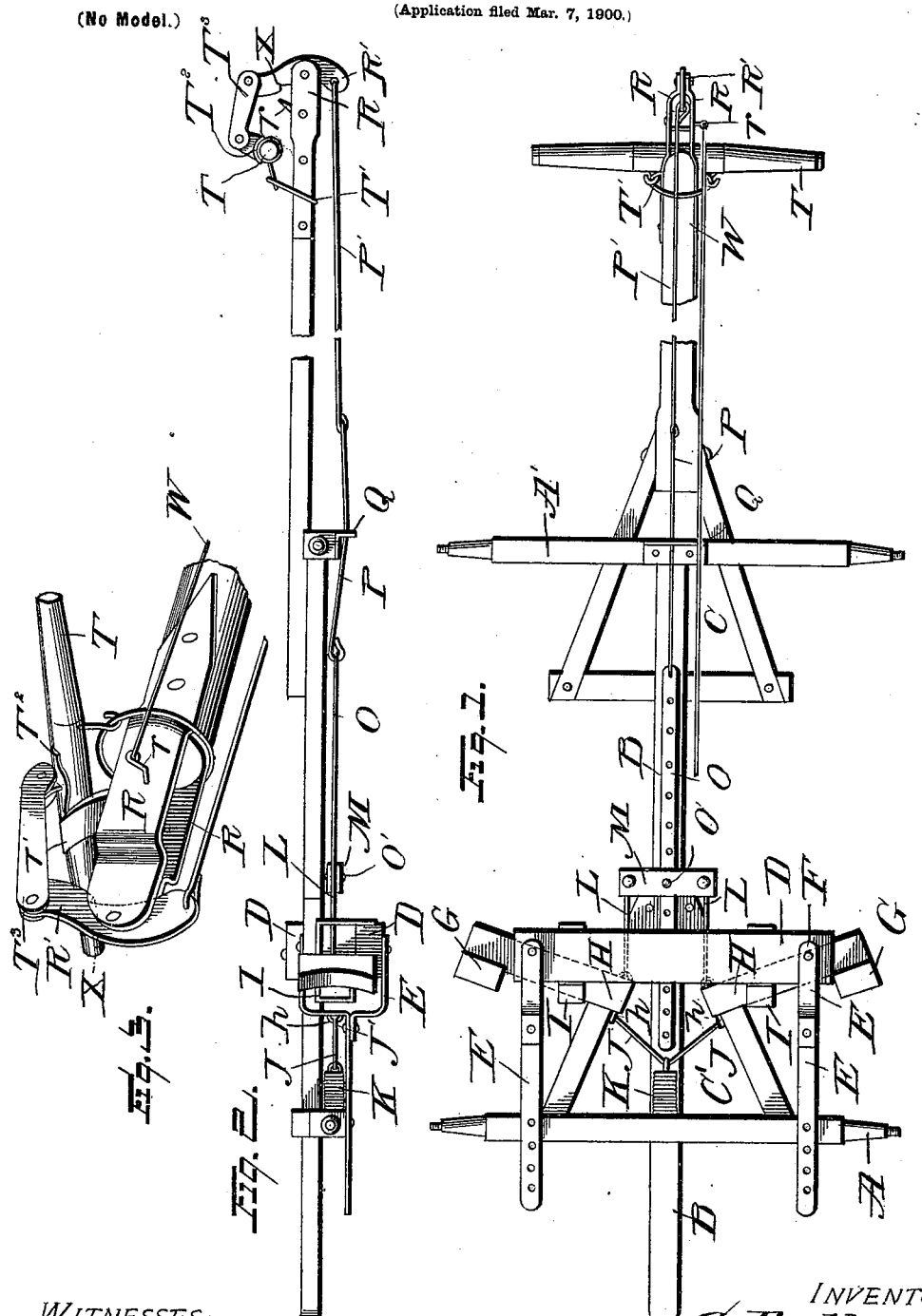

CHRISTHIAN BAKKOM AND AMIL T. ERIKSEN, OF CASHTON, WISCONSIN.

AUTOMATIC WAGON-BRAKE.

SPECIFICATION forming part of Letters Patent No. 650,702, dated May 29, 1900.

Application filed March 7, 1900. Serial No. 7,706. (No model.)

*To all whom it may concern:*

Be it known that we, CHRISTHIAN BAKKOM and AMIL T. ERIKSEN, citizens of the United States, residing at Cashton, in the county of Monroe and State of Wisconsin, have invented certain new and useful Improvements in Automatic Wagon-Brakes; and we do declare the following to be a full, clear, and exact description of the invention, such as will enable others skilled in the art to which it appertains to make and use the same, reference being had to the accompanying drawings, and to the letters of reference marked thereon, which form a part of this specification.
This invention relates to new and useful improvements in automatically-operated brakes for wagons, and especially to the provision of a brake for the wheels of a wagon, which brake is actuated by means of connections with a neck-yoke carried at the outer end of the pole of the wagon, whereby as the wagon descends an incline the brake will automatically be applied as the horses hold back the wagon, suitable means being provided to loosen the brake by means of a rope which actuates a lever for throwing the neck-yoke forward.

Our invention will be understood when taken in connection with the drawings forming part of this application.

The invention is clearly illustrated in the accompanying views, which, with the letters of reference marked thereon, form part of this application, and in which drawings similar letters of reference indicate like parts throughout the several views, in which—

Figure 1 is a perspective view of a wagon having our improved brake applied thereto. Fig. 2 is an enlarged detail view of the end of the tongue and connections between same and the whiffletree, and Fig. 3 is a detail view.

Reference now being had to the details of the drawings by letter, A designates the rear axle of a wagon, and A' the front axle, which are connected by means of a reach B of the ordinary construction, said axles having the hounds C and C', as in the ordinary constructions of wagons. On the rear hound C' of the wagon are the cross-pieces D, one above and one beneath the rear hound, and secured to the under face of the rear axle are the two bars E, which are perforated at their outer ends and forked, as at E', at their forward ends. Said cross-pieces D are fastened together by means of rods F, and mounted on said rods F are the pivoted levers H, which carry at their outer ends the brake-shoes G. Each lever H carries a brake-shoe adapted to engage the rear wheels of the vehicle. The forward ends of the bars E are mounted on the rods F and serve to hold said levers H in place and with their upper faces against the under face of the upper cross-piece D. To the inner ends of said levers H are mounted eyebolts $h$, to which the links J are connected, the opposite ends of said links to one end of the coiled spring K, which is fastened at its opposite end to the rear axle of the wagon. The opposite ends of said eyebolts are connected by means of the links L to the two plates M, which have central registering apertures and are connected together by bolts or other suitable means. Brackets I, secured to the upper of said cross-pieces D, are provided for the purpose of limiting the outward throw of the inner ends of the levers H.

A perforated brake-adjusting bar O is adapted to work between the plates M and is held in various positions between said plates by means of the pin O', which passes through registering apertures in said plates and bar. The forward end of said bar O has connected thereto a link P, which in turn is connected by means of a chain or rope P' to the lower end of the S-shaped lever R'. Said link P passes through and is guided in an apertured angled plate Q, mounted on the forward axle of the wagon. To the forward end of the tongue are connected the plates R, between which plates said S-shaped lever R' is pivoted. The neck-yoke T has secured thereto a ring T', which is carried about the outer end of the tongue, and secured to said neck-yoke is a plate $T^2$, having an apertured lug thereon to which the levers $T^3$ are pivoted, which levers are in turn pivoted at their opposite ends to the lower end of the lever R'.

Mounted between the plates R is a pin $r$, to which is secured a dog $r'$, adapted to engage the plate R and throw the same forward when the pin carrying said dog is rotated, so as to throw the dog against the lever R'. One end of said pin carrying the dog is bent and has a rope W secured to an eye on said bent portion. On the inner edge of the lever R' is a notch X, which is adapted to be engaged by the free end of the dog to hold said lever at its farthest outward throw when it is not desired to apply the brakes.

In operation when the dog is released from the lever R' by pulling on the rope W and as the wagon goes down an incline the drawing back of the neck-yoke will cause the lower end of the lever R' to be thrown forward, and with it the rod and connections between the same, and the inner ends of the brake-levers H and their opposite brake-shoe-carrying ends will be thrown against the rear wheels of the wagon.

What we claim to be new, and desire to secure by Letters Patent, is—

1. An automatic brake for wagons, comprising in combination with the truck of a wagon, the brake shoes and levers carrying the same, the yoke supporting said levers and adjustably held to the axle of the wagon, a spring for normally holding the brake-shoes from engagement with the wheels of the wagon, the plates M, the links connecting same with said levers, the apertured bar B to which said plates are adjustably held, the neck-yoke and connections between same and said bar, whereby the brakes may be applied, as set forth.

2. In combination with the truck of a wagon, the levers H, and brake-shoes, the spring secured at one end to the rear axle of the wagon, the links connecting said spring with the inner ends of said levers, the forked yoke and pin carried thereby, on which pin said levers are pivoted, one end of said yoke having a series of apertures and adjustably held to said axle, the plates N, the links connecting the latter with said levers H, the apertured bar B adjustably held to said plates M, the lever R' pivoted at the end of the tongue of the wagon, the neck-yoke having link connection with the upper end of said lever R', suitable connections between the lower end of the latter and said bar B, and means for holding the brakes from setting, as described.

In testimony whereof we affix our signatures in presence of two witnesses.

CHRISTHIAN BAKKOM.
AMIL T. ERIKSEN.

Witnesses:
GEO. E. TAYLOR,
EVEN GUDSOS.